F. Eves. Fanning Mill.
No. 119,340.　　　Fig. 1.　　　Patented Sep. 26, 1871.
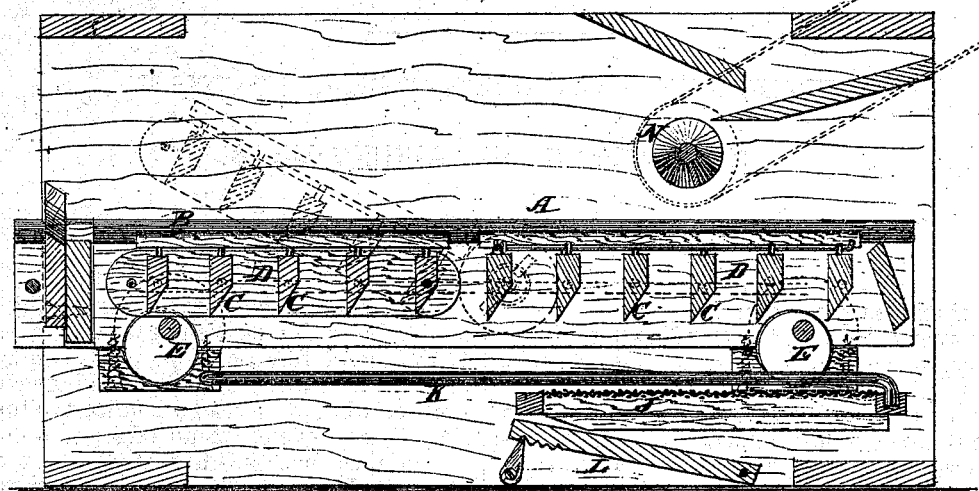
Fig. 2.
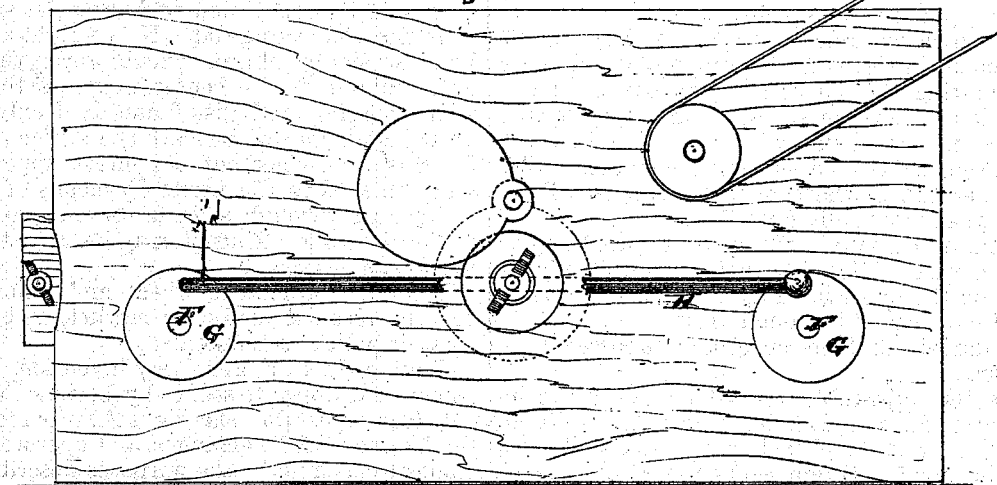
Fig. 3.
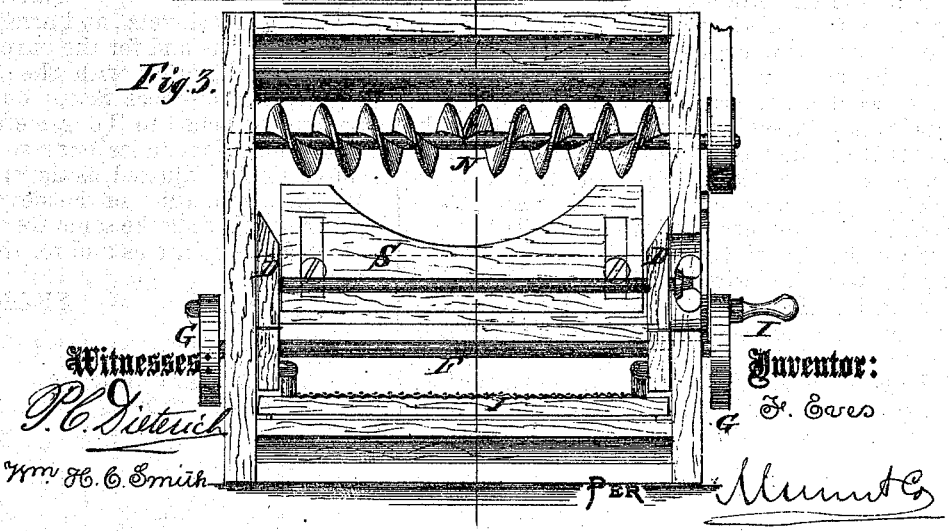
Witnesses:
P. C. Dieterich
Wm. H. C. Smith
Inventor:
F. Eves
per Munn & Co
Attorneys.

UNITED STATES PATENT OFFICE.

FRANCIS EVES, OF FOUNTAIN CITY, WISCONSIN.

IMPROVEMENT IN FANNING-MILLS.

Specification forming part of Letters Patent No. 119,340, dated September 26, 1871.

*To all whom it may concern:*

Be it known that I, FRANCIS EVES, of Fountain City, in the county of Buffalo and State of Wisconsin, have invented a new and useful Improvement in Fanning-Mills; and I do hereby declare that the following is a full, clear, and exact description thereof, which will enable others skilled in the art to make and use the same, reference being had to the accompanying drawing forming part of this specification.

This invention relates to a new and useful improvement in sieves for fanning-mills, and mode of operating the same; and consists in an adjustable slat sieve or sieves operated by means of eccentrics, and in a wire sieve or screen beneath said adjustable slat sieve connected with and operated by the said slat sieve, as will be hereinafter more fully described.

In the accompanying drawing, Figure 1 represents a vertical longitudinal section of Fig. 3 taken on the line $x\ x$. Fig. 2 is a sectional side elevation. Fig. 3 is an end view.

Similar letters of reference indicate corresponding parts.

A is the adjustable wood-slat sieve, made in two parts, the part B being pivoted at one end so as to be raised and inclined, as seen in dotted lines in Fig. 1. C represents the slats; D, the sides of the sieve-frame. The slats of each part are connected together by wires, and hinged to rods so as to be opened and closed and adjusted after the manner of window-blinds. E represents eccentrics on cross-shafts F F beneath the slat sieves. These shafts are provided with crank-wheels G on their ends on the sides of the fanning-mill. H represents a rod on each side, by which the shafts are connected together. I is a crank-handle, by means of which the shafts are revolved and the sieves are operated. A pulley may be used, if desired. The eccentrics E revolve inside the mill in circular cavities in the sides of the main slat sieve, so that the sieves receive a longitudinal motion equal to the throw of the eccentrics. The part of the sieve marked B is pivoted to the sides of the main sieve, so that its end may be raised, thus placing it in an inclined position, as seen in dotted lines in Fig. 1. While in this position its slats may be adjusted, and it will receive its shaking motion the same as when it is in a horizontal position. The slats C are beveled to an edge, as seen in the drawing, so that the chaff is allowed a free discharge. J represents the wire sieve, which is made to vibrate longitudinally with the mill by means of its connection with the slat sieve A. K is the connecting-rod. N is a right-and-left-hand screw-distributer, which works the chaff and grain from the center, prevents the chaff from clogging, and distributes it evenly. L is an adjustable apron beneath the screen or sieve J. S is a tail-piece cut out on its upper edge, and attached to the frame by means of screws which pass through slots in its ends, as shown in the drawing. Thus it may be adjusted vertically, as desired.

With this apparatus wheat and other grain may be cleaned ready for market, and in the most expeditious manner.

Having thus described my invention, I claim as new and desire to secure by Letters Patent—

1. The adjustable slat sieve A, provided with the hinged part B, arranged and operating substantially as and for the purposes described.

2. The eccentrics E, in combination with the adjustable slat sieve A, and arranged to operate substantially as and for the purposes described.

3. In combination with the adjustable slat sieve A, the tail-piece S, cut out on its upper edge and attached to the frame by screws passing through slots in its ends so as to permit it to be vertically adjusted, as shown and described.

4. The combination of the sieves A and J and distributer N, when the same are constructed and arranged to operate as and for the purposes set forth.

FRANCIS EVES.

Witnesses:
  A. FINKELNBURG,
  JOHN ELDRIDGE.